(12) United States Patent
Inagaki et al.

(10) Patent No.: US 7,177,310 B2
(45) Date of Patent: Feb. 13, 2007

(54) NETWORK CONNECTION APPARATUS

(75) Inventors: Yukihide Inagaki, Yokohama (JP); Hidemitsu Higuchi, Ebina (JP); Tatsuya Watanuki, Ebina (JP); Shigeki Yoshino, Hadano (JP); Yoshitaka Sainomoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 941 days.

(21) Appl. No.: 10/093,526

(22) Filed: Mar. 11, 2002

(65) Prior Publication Data

US 2002/0126680 A1    Sep. 12, 2002

(30) Foreign Application Priority Data

Mar. 12, 2001   (JP) .............................. 2001-067954

(51) Int. Cl.
*H04L 12/28*   (2006.01)

(52) U.S. Cl. ...................................... 370/392

(58) Field of Classification Search ..................... None
See application file for complete search history.

(56) References Cited

U.S. PATENT DOCUMENTS

| | | | | |
|---|---|---|---|---|
| 5,434,863 A * | 7/1995 | Onishi et al. ................ | 370/402 |
| 5,463,621 A | 10/1995 | Suzuki et al. ................ | 370/399 |
| 5,490,252 A | 2/1996 | Macera et al. ............... | 709/249 |
| 5,822,319 A | 10/1998 | Nagami et al. .............. | 370/392 |
| 5,978,844 A | 11/1999 | Tsuchiya et al. | |
| 5,982,296 A * | 11/1999 | Wakasa et al. ............... | 370/392 |
| 6,112,248 A | 8/2000 | Maciel et al. ................ | 709/238 |
| 6,122,285 A * | 9/2000 | Okada ......................... | 370/450 |
| 6,272,522 B1 * | 8/2001 | Lin et al. ..................... | 709/200 |
| 6,385,657 B1 * | 5/2002 | Parady ........................ | 370/223 |
| 6,496,510 B1 | 12/2002 | Tsukakoshi et al. ........ | 370/401 |
| 6,501,761 B1 * | 12/2002 | Pannell et al. .............. | 370/403 |
| 6,604,147 B1 | 8/2003 | Woo ............................ | 709/240 |
| 6,611,522 B1 | 8/2003 | Zheng et al. ............ | 370/395.21 |
| 6,704,794 B1 | 3/2004 | Kejriwal et al. ............. | 709/236 |
| 6,724,769 B1 * | 4/2004 | Sang ........................... | 370/429 |
| 6,771,662 B1 | 8/2004 | Miki et al. ................... | 370/469 |
| 6,947,410 B1 * | 9/2005 | Schwartz et al. ............ | 370/352 |
| 7,068,656 B2 * | 6/2006 | Sainomoto et al. ......... | 370/392 |
| 7,092,392 B2 * | 8/2006 | Yoshino et al. ............. | 370/392 |
| 2002/0083344 A1 * | 6/2002 | Vairavan ..................... | 709/223 |

FOREIGN PATENT DOCUMENTS

JP          5199230         8/1993

OTHER PUBLICATIONS

Network Working Group, Request for Comments: 2401 Kent et al., Nov. 1998, Security Architecture for the Internet Protocol.

* cited by examiner

*Primary Examiner*—Chi Pham
*Assistant Examiner*—Anh-Vu Ly
(74) *Attorney, Agent, or Firm*—Mattingly, Stanger, Malur & Brundidge, P.C.

(57) ABSTRACT

There is provided a packet routing apparatus for performing an IP additional function processing for a packet in the middle of a packet routing processing without damaging the high speed characteristic of the packet routing processing. A unique address is determined for each of function accelerators 11 to 14 in the inside of an extended function module 6, the unique address is added to a packet by a physical address lookup unit 105, and a data distribution unit 112 distributes the packet to the function accelerator corresponding to the unique address.

18 Claims, 4 Drawing Sheets

NETWORK CONNECTION APPARATUS

CROSS-REFERENCE TO RELATED APPLICATIONS

The present application is related to "INTERNETWORKING APPARATUS FOR CONNECTING PLURAL NETWORK SYSTEMS AND COMMUNICATION NETWORK SYSTEM COMPOSED OF PLURAL NETWORK SYSTEMS MUTUALLY CONNECTED", by K. Onishi et al, Ser. No. 09/935,919, filed Aug. 27, 1992, now U.S. Pat. No. 5,434,863; "A PACKET ROUTING APPARATUS" by S. Yoshino et al, Ser. No. 10/093,525, filed Mar. 11, 2002 claiming priority on Japanese patent application No.2001-077585; "A PACKET ROUTING APPARATUS AND A METHOD OF ROUTING A PACKET", by Y. Sainomoto et al, Ser. No. 10/093,527, filed Mar. 11, 2002 claiming priority on Japanese patent application No.2001-077607, the contents of which are each incorporated herein by reference.

BACKGROUND OF THE INVENTION

The present invention relates to a packet routing apparatus (network connection apparatus) for mutually connecting a plurality of networks, and its routing processing method.

As a packet routing apparatus (network connection apparatus) for connecting a plurality of networks, there is a bridge for performing mutual connection in a data link layer of a network system hierarchy, a router apparatus for performing mutual connection in a network layer of an upper layer thereof, or the like.

The bridge manages a MAC (Media Access Control) address, and judges whether or not a received frame from a network should be routed to another network, in accordance with the content of a destination MAC address in the received frame and a filtering address table as routing control information.

The router apparatus selects a predetermined route or an optimum route in accordance with an address in the received frame and a route information table stored in the router apparatus, and routes the received frame.

There are some kinds of protocols used in the network layer, and an IP (Internet Protocol) is known as a typical example. In the IP protocol, an IP address is used for networking. The IP protocol, together with a TCP (Transmission Control Protocol) in an upper transport layer, is often called TCP/IP.

The packet routing apparatus, such as the bridge apparatus, the router apparatus, or a brouter apparatus having both a bridge function and a router function, is constructed to include at least two communication ports and a processor for performing a routing processing.

As a conventional technique for performing a routing processing of an IP packet, a technique disclosed in Japanese Patent Unexamined Publication No. Hei. 5-199230can be cited. According to this, there are provided a router management unit for mainly performing apparatus management of the whole packet routing apparatus, such as route information management, and a plurality of routing accelerators for assisting the former to dedicatedly process a routing processing of a packet. The router management unit and the routing accelerators, or the respective routing accelerators are connected by a high speed router bus, and the routing processing of the packet is independently and dispersedly performed by the plurality of routing accelerators.

The routing processing can be performed at high speed by the plurality of routing accelerators, and when routing accelerators are further added, it is possible to easily realize a large scale network from a small scale one.

While the speed-up of a routing processing of an IP packet is demanded, various new functions have been added in the IP network in addition to existing functions. For example, there is an IPsec function of encrypting a packet in an IP layer, for construction of VPN (Virtual Private Network), a NAT (Network Address Translator) function of mutually converting a private IP address and a global IP address, for private network construction as a countermeasure against IP address insufficiency, a load balancing function of seamlessly using a plurality of servers by making the plurality of servers typified by one IP address for a client, an illegal packet detection, a filtering function, or the like. In these additional functions, a processing quite different from a normal routing processing of an IP packet must be carried out, for example, modification of an IP address, encryption/decryption of a data portion in the IP packet, comparison with a detailed table for detection of an illegal packet, or the like.

Incidentally, the specifications and requirements of various techniques relating to the Internet are published as RFC (Request For Comment) with serial number by IETF (Internet Engineering Task Force). For example, RFC2401can be cited in relation to the IPsec function, RFC1631, RFC2391 and RFC2663 can be cited in relation to the NAT function or the load balancing function, and RFC2267 etc. can be cited in relation to the filtering function. In the following description, the foregoing IPsec function, the NAT function, the load balancing function, the illegal packet detection function, and the like are together expressed as IP additional functions.

In the conventional packet routing apparatus, in the case where a plurality of processing units having the IP additional functions are provided in the middle of an internal transmission route of the packet routed by the apparatus, means for specifying a necessary IP additional function processing unit for each packet is newly required.

Besides, there has been a problem that if a dedicate route is provided in parallel, which transmits each packet to an objective IP additional function processing unit after the necessary IP additional function processing unit for each packet is specified, a circuit scale becomes large, and packet transmission between different IP additional functions becomes difficult.

SUMMARY OF THE INVENTION

In order to achieve the object, according to the present invention, an address is given to each of function blocks (modules) as structural elements of an auxiliary processor for performing an additional function. Incidentally, the additional function in the auxiliary processor includes functions other than a routing function. Besides, the additional function includes an address conversion processing of data, and an information processing of security reinforcement of the data. The functional block includes a PCI device.

In the more detailed structure of the present invention, an extended function module is provided in the middle of an internal transmission route of data (packet) routed by the apparatus, and a plurality of IP additional functions different in character or mode are implemented in the inside.

Besides, the extended function module includes one or plural function accelerators in its inside, and may include a packet processing unit for determining a unique address for each of the function accelerators and adding the unique address to the data received from an upper bus, and data distribution means for distributing the packet added with the unique address to a corresponding function accelerator in accordance with the unique address.

Further, in order to achieve the object, the same format as a MAC address is used as the address uniquely determined for each function accelerator, and the unique address may be added to the data as a destination MAC address of an Ethernet frame.

Further, in order to achieve the object, in a data transmission controller circuit in which packet data is received from a first bus in the extended function module and is routed to one or plural devices connected through a second bus, it may include individual data transmitting buffers corresponding to the respective devices connected to the second bus, and means for interpreting an address contained in the packet received from the first bus to distribute the packet to the corresponding data transmitting buffer.

The data transmission controller circuit may include individual data receiving buffers corresponding to the respective devices connected to the second bus, and data transmission means toward the first bus.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

An embodiment relates to a communication network system for connecting a plurality of networks in a network layer level, and particularly to a system which includes an extended function module for processing additional functions, such as an IPsec function, a NAT function, a load balancing function, and an illegal packet detection function, in addition to a normal routing processing function, and distributes a packet at high speed to respective additional function processing units included in the extended function module.

Figure 1:
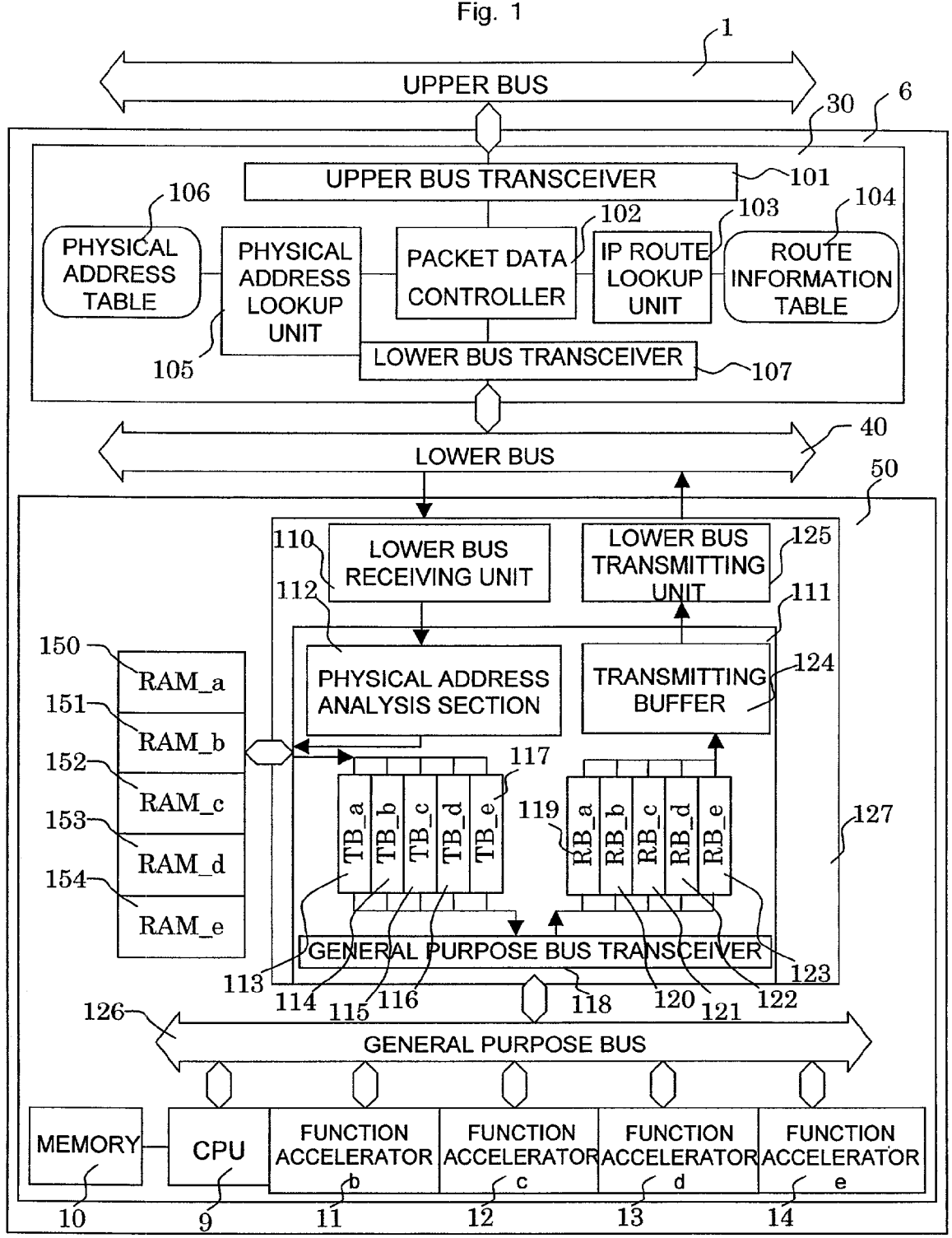
FIG. 1 is a block diagram showing a structure of a built-in extended function module of a packet routing apparatus according to an embodiment of the present invention.

First, a packet routing apparatus as an embodiment of the present invention will be described with reference to FIGS. 1 and 2. FIG. 1 is a block diagram of a built-in extended function module of the packet routing apparatus according to the present invention, and FIG. 2 is a general block diagram of the packet routing apparatus.

Figure 2:
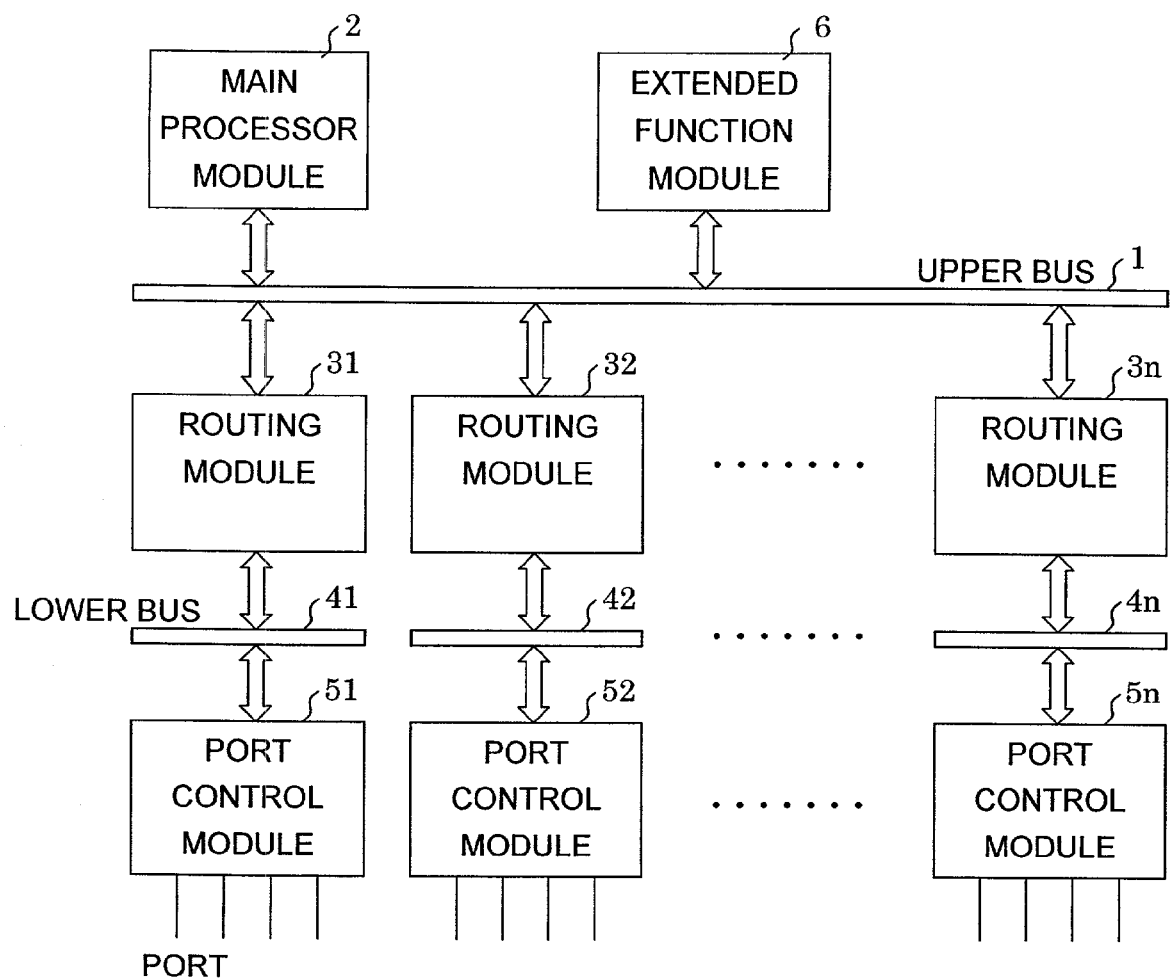
FIG. 2 is a general block diagram showing a structure of the packet routing apparatus according to the embodiment of the present invention.

In FIG. 2, the packet routing apparatus includes plural sets of modules for performing routing processing, and the number of ports can be easily increased by increasing the sets of modules. The sets of modules for performing the packet routing processing are respectively constituted by routing modules 31, 32, . . . , 3n and one or plural port control modules 51, 52, . . . , 5n connected to these modules through lower buses 41, 42, . . . , 4n. The respective routing modules are mutually connected through an upper bus 1, and further, a main processor module 2 and an extended function module 6 for performing an IP additional function processing for a data packet are connected to the upper bus 1. Although the upper bus 1 may be a bus system in which data is made to flow to a route common to the respective modules while appointing a data transmission partner, it may be a change-over switch structure in which a connection to a data transmission partner is established in one-to-one correspondence, and a connection to another module is opened. The main processor module 2 has a management function of the whole packet routing apparatus, and further, has a function of generating routing tables for the respective routing modules 31, 32, . . . , 3n and distributing the generated routing tables to the respective routing modules 31, 32, . . . , 3n, and the like.

The respective port control modules 51, 52, . . . , 5n are interfaces corresponding to various link systems, and can be selected and mounted according to uses in, for example, Ethernet link of 100 Mbps or 10 Mbps, so-called gigabit Ethernet of 1 Gbps or higher, a port control module of an interface system different from the Ethernet, such as FDDI, ISDN or ATM, and the like.

Next, a normal packet routing processing in the packet routing apparatus 145 will be described below. First, it is assumed that the main processor module 2 distributes the routing tables to the respective routing modules 31, 32, . . . , 3n, and the respective routing modules 31, 32, . . . , 3n have routing information. This routing table is a collective of routing information in which information necessary for a routing processing is made to correspond to each IP address. For example, with respect to a packet inputted to the port control module 51 of a reception side from an external link, a destination IP address is analyzed by the routing module 31 directly connected through the lower bus 41, and a corresponding port control module, for example, the port control module 52 is selected as a transmission side for the address from the routing table. Next, this packet is transmitted to the port control module 52 through the upper bus 1, the routing module 32, and the lower bus 42. The packet transmitted to the port control module 52 of the transmission side is transmitted to the external link, and the packet routing processing of the whole packet routing apparatus 145 is completed.

In the case where the processing by the extended function module 6 is performed, with respect to a packet entered into the port control module 51 of the reception side from the external link, a next transmission destination is appointed as the extended function module 6 by the routing module 31 directly connected through the lower bus 41, and is transmitted to the extended function module 6 through the upper bus 1. The packet having subjected to the processing by the extended function module 6 is again transmitted to a suitable transmission side port control module, for example, the module 52, and is transmitted to the external link from this.

In FIG. 1, the extended function module 6 is constituted by a routing module 30, an extended function processing module 50, and a lower bus 40 connecting these, similarly to the module pair for the routing processing.

The routing module 30 directly connected to the upper bus 1 is constituted by an upper bus transceiver 101, a packet data controller 102, a physical address lookup unit 105, a physical address table 106, an IP route lookup unit 103, a route information table 104, and a lower bus transceiver 107. The inside of the extended function processing module 50 is constituted by a lower bus receiving unit 110, a data transmission controller 111, an external RAM_a to an external RAM_e (150 to 154), a lower bus transmitting unit 125, a general purpose bus 126, a CPU 9, a memory 10 for storing a program and data, and a function accelerator_b to a function accelerator_e (11 to 14). Further, the data transmission controller 111 is constituted by a physical address analysis section 112, bus transmitting buffers 113 to 117, a general purpose bus transceiver 118, bus receiving buffers 119 to 123, and a common transmitting buffer 124.

Before a data flow of the extended function module 6 is described, a general structure of a packet and a specification example of the packet routing apparatus will be described with reference to FIGS. 3 and 4.

Figure 3:
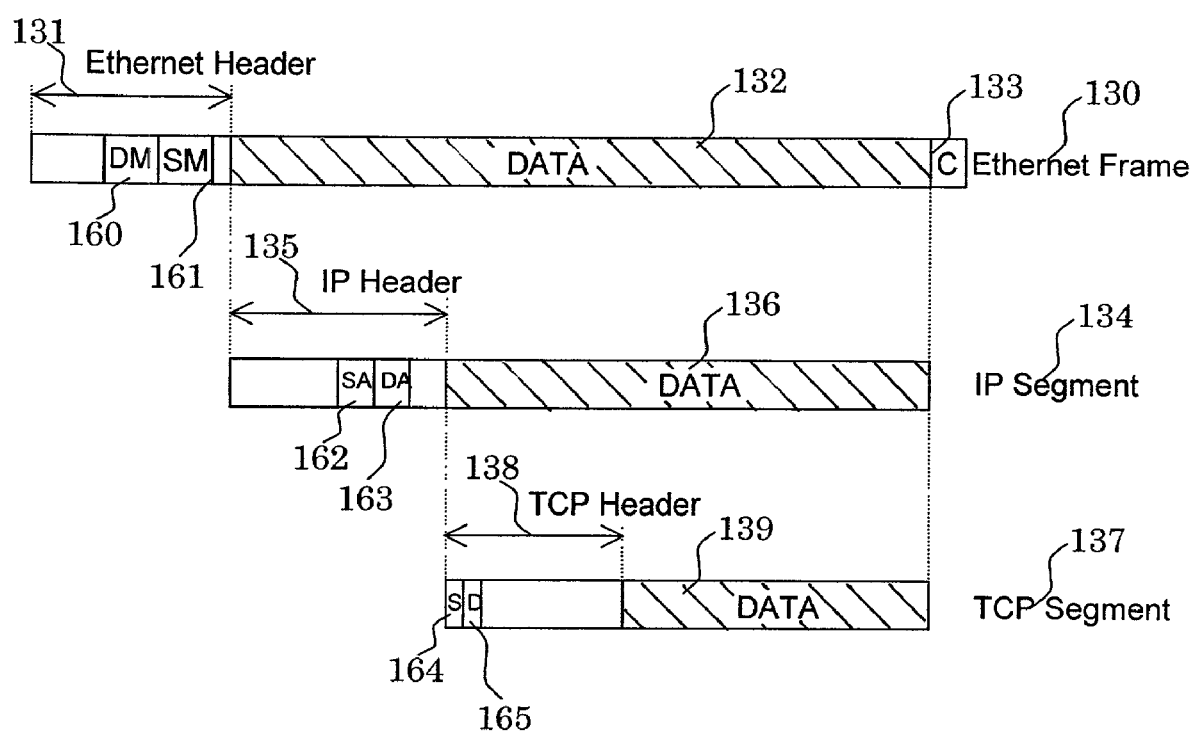
FIG. 3 is a view for explaining a structure of a packet to be processed in a network apparatus.

FIG. 3 is a view for explaining the structure of the packet to be processed in the network apparatus. An Ethernet frame 130 is a general outline of an Ethernet packet in a data link layer, and is roughly formed of an Ethernet header 131, data 132, and an error check sequence 133. In the case of the TCP/IP protocol, the data 132 of the Ethernet frame 130 corresponds to an IP packet 134 in an upper network layer. The IP packet 134 is constituted by an IP header 135 and data 136. The data 136 corresponds to a TCP segment 137 in an upper transport layer, and is constituted by a TCP header 138 and data 139. The Ethernet header 131 includes a destination MAC address 160 and a transmission source MAC address 161. The IP header 135 includes a destination IP address 163 and a transmission source IP address 162. The TCP header includes a destination port 165 and a transmission source port 164.

Figure 4:
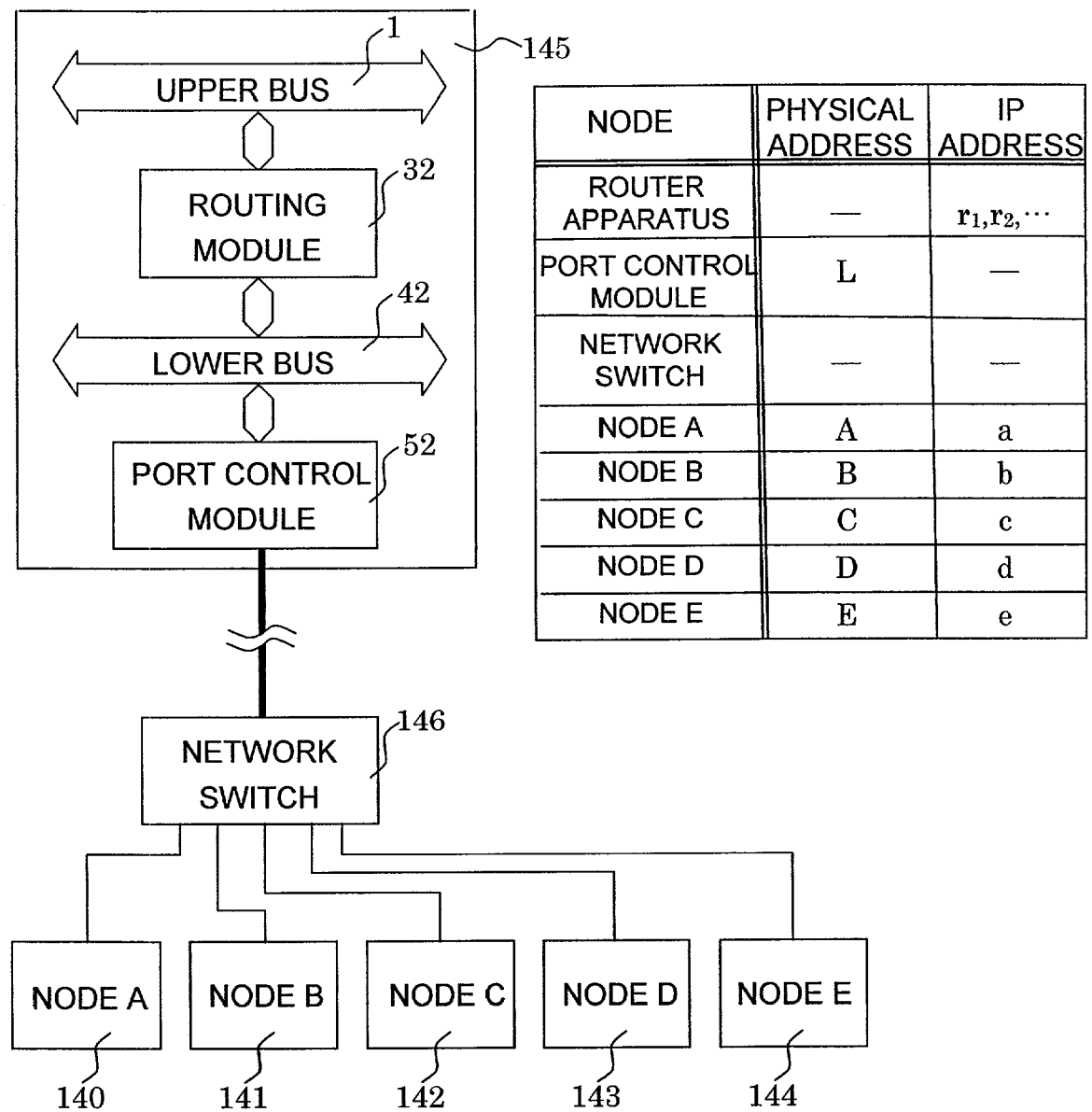
FIG. 4 is a view showing a connection example of the packet routing apparatus and an external network.

FIG. 4 is a view showing a connection example of the packet routing apparatus and the external network. Here, the port control module 52 is limited to the gigabit Ethernet and a description will be given. The port control module 52 has only one external link channel, and is connected to an external network apparatus by using a cable. The cable includes a gigabit Ethernet cable. In this case, if a partner to be connected can deal with the gigabit Ethernet, it may be a computer or a packet routing apparatus However, branch into plural nodes is easily achieved by connection with a network switch 146. Nodes A to E (140 to 144) as some network equipment are connected to the ends of the network branched by the network switch 146.

Now, in general, an intrinsic MAC address is given to a node of the Ethernet. In this example, as shown in FIG. 4, the MAC address given to the port control module 52 is designated by L. Incidentally, the port control module 52 in this embodiment has only one channel of the external connection link, and the number of MAC addresses given in relation to this is also one. The external connection link may have plural channels. Similarly, it is assumed that the node A (140) has a MAC address A, the node B (141) has a MAC address B, the node C (142) has a MAC address C, the node D (143) has a MAC address D, and the node E (144) has a MAC address E. The network switch 146 is a device for routing the packet without processing the packet, and does not have the MAC address. Further, network apparatuses using the TCP/IP protocol are respectively given intrinsic IP addresses. The IP addresses given to the nodes A to E (140 to 144) are respectively designated by a, b, c, d and e. Although depending on the kind and the number of built-in port control modules, the IP address given to the packet routing apparatus 145 is designated by r1, r2, r3, . . . in the case where it is not single. The port control module 52 itself is a physical network interface, and it is not necessary to have the IP address. Also, since the LAN switch does not perform a processing in an upper layer higher than the network layer, it is not necessary to have the IP address.

Now, the data flow in the extended function module will be described with reference to FIG. 1. Virtual MAC addresses are respectively allocated to the CPU 9 and the function accelerators 11 to 14 connected to the general purpose bus 126. Since these are not network nodes, it is not necessary for them to actually have the MAC addresses. The virtual MAC addresses correspond to the MAC addresses allocated to the respective nodes 140 to 144 in FIG. 4. In the built-in physical address table 106 of the extended function module, the virtual MAC addresses suitably coupled to respective IP addresses are made to correspond to each other and are described. When the IP packet 134 reaches the packet data controller 102 from the upper bus 1 through the upper bus transceiver 101, the physical address lookup unit 105 extracts the destination IP address 163, and refers to the physical address table 106. In the case where this IP packet should be subjected to the IPsec processing by the function accelerator_b (11), the virtual MAC address of the function accelerator b_(11) has been recorded in the physical address table 106 correspondingly to the destination IP address 163. When the virtual MAC address is found, the packet data controller 102 transmits the IP packet and the corresponding virtual MAC address from the lower bus transceiver 107 to the lower bus receiving unit 110 through the lower bus 40. The lower bus receiving unit 110 uses the simultaneously received virtual MAC address and a suitable transmission source MAC address, and adds the Ethernet header 131 and the error check sequence 133 to the IP packet to generate the Ethernet frame 130. The Ethernet frame 130 generated by the lower bus receiving unit 110 is next transmitted to the physical address analysis section 112 and the destination MAC address is analyzed. Since this destination MAC address is the virtual MAC address allocated to the function accelerator b (11) as described above, the Ethernet frame is stored in the RAM_b (151). The storage may be temporary like buffering. In the case where the destination MAC address is the virtual MAC address allocated to the CPU 9, the Ethernet frame is stored in the RAM_a (150).

Subsequently, in the same way, Ethernet frames are stored in the respective RAMs correspondingly to the different virtual MAC addresses. The bus transmitting buffers 113 to 117 correspond to the RAM_a to the RAM_e (150 to 154) in one-to-one correspondence, and are used as transmitting buffers when the Ethernet frames stored in the RAM are transmitted to the CPU 9 or the respective function accelerators 11 to 14 via the general purpose bus 126. In this way, the respective Ethernet frames are transmitted to the devices corresponding to the respective virtual MAC addresses. As stated above, the physical address lookup unit 105 judges the devices of the destinations in advance, and adds the destinations in the form of the virtual MAC addresses to the respective packets, so that the IP packets having different destinations can be transmitted to the extended function processing module 50 through the same lower bus 40 again. The data transmission controller 111 has only to extract at most five kinds of destinations from the received Ethernet frames, and the distribution to the RAM_a to the RAM_e can be performed by hardware at high speed. Besides, the complicated distribution of destinations by the analysis of the IP address is performed by the physical address lookup unit 105, and the data distribution is performed by the data transmission controller 111, so that the respective blocks can be made to have simple structures.

When the respective IP additional function processings are ended in the CPU 9 and the function accelerators 11 to 14, the processed data packets are respectively sent to the data transmission controller 111 through the general purpose bus 126. The timing of sending may be the point of time when the IP additional function processing is terminated. The data sent from the CPU 9 is temporarily stored in the buffer 119, and when the transmission in the general purpose bus 126 is terminated, the data is sent to the common transmitting buffer 124, and is further sent to the lower bus transmitting unit 125. The timing of sending to the common transmitting buffer 124 may be the point of time of termination of the transmission. Besides, the data packet sent from the function accelerator_b (11) is stored in the buffer 120 through the general purpose bus 126, and reaches the lower bus transmitting unit 125 through the common transmitting buffer 124. Similarly, the data packets sent from the function accelerators_c to e (12 to 14) reach the lower bus transmitting unit 125 through the different buffers 121 to 123.

The lower bus transmitting unit 125 removes the Ethernet header 131 and the error check sequence 133 from the data packet and changes it into the format of the IP packet 134. This processed IP packet is transmitted to the packet data controller 102 through the lower bus 40 and the lower bus transceiver 107. Further, the IP route lookup unit 103 extracts the destination IP address 163 from the processed IP packet, and refers to the route information table 104. Correspondingly to the destination IP address 163 of the IP packet, information of a routing module to which this packet is to be transmitted is obtained from the route information table 104. The IP packet in which the future routing destination has been determined by this routing information is transmitted from the upper bus transceiver 101 to the upper bus 1. The packet in which the processing in the extended function module 6 is terminated in this way is returned to the route of the packet routing processing and is transmitted to a suitable port control module (for example, the module 52), and is transmitted to the external link.

In the data transmission controller 111, the transmitting buffers 113 to 117 toward the general purpose bus 126, and the receiving buffers 119 to 123 from the general purpose bus 126 are separately and dedicatedly prepared for the CPU 9 and the respective function accelerators 11 to 14, so that the processing of data can be made easy to arrange in relation to the bus transmission occurring in unspecified sequence in the general purpose bus 126. For example, since the Ethernet frame comes to have about 1.5 K bytes at the maximum, in the case where the general purpose bus 126 is a PCI bus, there is a possibility that the transmission of one packet is not completed in one continuous transmission cycle. Even in such a case, since the buffer of each destination is prepared for transmission and reception, reconstruction of the packet can be easily made. Thus, in the case of the PCI transmission, the capacity of about 2 K bytes is secured so that the respective buffers 113 to 117 and 119 to 123 can completely store the packet of the maximum length. Since a data transmission clock used between the lower bus receiving unit 110 and the data transmission controller 111 does not necessarily coincide with a clock of the general purpose bus 126, when the RAMs 150 to 154 are separated from the bus transmitting buffers as described above, the synchronization between the different clocks can be carried out. Similarly, since there is a case where a data transmission clock used between the data transmission controller 111 and the lower bus transmitting unit 125 is different from the clock of the general purpose bus 126, the bus receiving buffers 119 to 123 are made independent from the common transmitting buffer 124, so that the synchronization between the different clocks is made easy to carry out.

The embodiment of the present invention as described above has the following effects.

Since the physical address lookup unit 105 judges the destination devices in advance and adds the destinations in the form of the physical addresses of the virtual MAC addresses to the respective packets, transmission routes of the IP packets can be gathered into the lower bus 40, and the transmission route from the routing module 30 to the extended function processing module 50 and the circuit scale can be made simple. Besides, the data transmission controller 111 has only to extract at most five kinds of destinations from the received Ethernet frames, and the distribution to the RAM_a to the RAM_e can be performed at high speed by the hardware.

Besides, the complicated distribution of the destination by the analysis of the IP address is performed by the physical address lookup unit 105, and the data transmission controller 111 performs the data distribution, so that the respective blocks can be made to have simple structures.

In the data transmission controller 111, since the transmitting buffers 113 to 117 toward the general purpose bus 126, and the receiving buffers 119 to 123 from the general purpose bus 126 are separately and dedicatedly prepared for the respective devices 9, 11 to 14, the data processing can be made easy to arrange for the bus transmission occurring in unspecified sequence. Particularly, since the data transmitted in the format of the Ethernet frame has about 1.5 K bytes at the maximum, it is conceivable that the transmission of one packet is not completed in a series of PCI continuous transmission cycles. Even in such a case, since the buffers for the respective transmission destinations are prepared for transmission and reception, re-construction of the packet can be easily made, and the circuit structure becomes simple.

Since the RAMs 150 to 154 mainly used for the data transmission of the data transmission controller 111 and the bus transmitting buffers 113 to 117 are separately prepared, it becomes possible to carry out the synchronization of the transmitting units operating at different clocks, and the transmission control can be made simple.

Besides, it becomes possible to provide a router apparatus for realizing a plurality of packet processings having different characteristics.

According to the present invention, it becomes possible to provide a packet routing apparatus which can perform additional functions.

What is claimed is:

1. A network connection apparatus connected to a plurality of networks, for routing data between the plurality of networks, and extending a function of a network system, comprising:

a routing module connected to a first bus and for routing data transmitted through the first bus; and a control module connected to the routing module through a second bus and having a plurality of accelerators for a predetermined function, wherein the routing module further has an address table in which unique addresses allocated to each of the accelerators of the control module are recorded corresponding to IP addresses, and finds the unique address of the accelerator corresponding to the IP address of the data received from the first bus by referring to the address table, adds the found unique address of the accelerator to the data and transmits the data including the unique address of the accelerator to the control module through the second bus, and wherein the control module analyzes the unique address of the accelerator added to the data, processes the predetermined function to the data by the accelerator which has the analyzed unique address of the accelerator and transmits the processed data to the routing module through the second bus.

2. A network connection apparatus according to claim 1, wherein the found unique address accelerator performs an additional function of a conversion processing for the data.

3. A network connection apparatus according to claim 2, wherein the found unique address accelerator performs either one of a conversion processing of an IP address of a transmission destination of the data or an information processing of security reinforcement of the data.

4. A network connection apparatus according to claim 2, wherein the data is packet data.

5. A network connection apparatus according to claim 4, wherein the control module has data storage including storage regions corresponding to each of the accelerators and a third bus connecting the plurality of accelerators of the control module, receives the packet data from the second bus, stores it in a storage region of the data storage corresponding to the packet data, and transmits the stored packet data to the accelerator corresponding to the storage region among the plurality of accelerators through the third bus.

6. A network connection apparatus according to claim 1, wherein the unique address of the accelerator is a MAC address.

7. A network connection apparatus according to claim 1, wherein the first bus is connected to a plurality of routing modules, and
wherein the second bus is connected to the plurality of routing modules and a plurality of control modules.

8. A network connection apparatus according to claim 1, wherein the control module is an interface corresponding to a link system.

9. A network connection apparatus according to claim 1, wherein the address table includes an IP address of the routing module without a unique address of the routing module, and
wherein the address table includes a unique address of the control module without an IP address of the control module.

10. A network connection apparatus according to claim 1, wherein the control module adds a header and a check sequence to the data in the case of receiving the data through the second bus, and removes the header and the check sequence from the data in case of transmitting the data through the second bus.

11. A network connection apparatus according to claim 1, wherein the found unique address accelerator is implemented by a software.

12. A network connection apparatus according to claim 1, wherein the found unique address is a virtual MAC address.

13. A network connection apparatus connected to a network, for routing data on the network, comprising:

a first bus for transmitting received data;
a routing module connected to the first bus and for routing the data transmitted through the first bus;
a second bus; and
a control module connected to the routing module through the second bus and connected to an external node through the network, for transmitting the data to the external node and receiving the data from the external node through the network, and having a plurality of devices for information processing,
wherein the routing module further has an address table in which unique addresses allocated to each of the devices of the control module are recorded corresponding to IP addresses, and finds the unique address of the device corresponding to the IP address of the data received from the first bus by referring to the address table, adds the found unique address of the device to the data and transmits the data including the unique address of the device to the control module through the second bus, and wherein the control module has data storage including storage regions corresponding to each device and a third bus connecting the plurality of devices, receives the data from the second bus, stores it in a storage region of the data storage corresponding to the data, and transmits the stored data through the third bus to the device corresponding to the storage region among the plurality of devices.

14. A network connection apparatus according to claim 13, wherein the found unique address device performs an additional function of a conversion processing for the data.

15. A network connection apparatus according to claim 14, wherein the found unique address device performs, as the additional function, at least one of a conversion processing of a network address as a transmission destination of the data or an information processing of security reinforcement of the data.

16. A network connection apparatus according to claim 14, wherein the data is packet data.

17. A network connection apparatus according to claim 13, wherein the unique address of the device is a MAC address.

18. A network connection apparatus according to claim 13, wherein the routing module receives the data from the control module through the second bus when the control module receives the data through the network, analyzes the IP address of the data, and transmit the data including the IP address through the first bus.

* * * * *